Patented Oct. 20, 1931

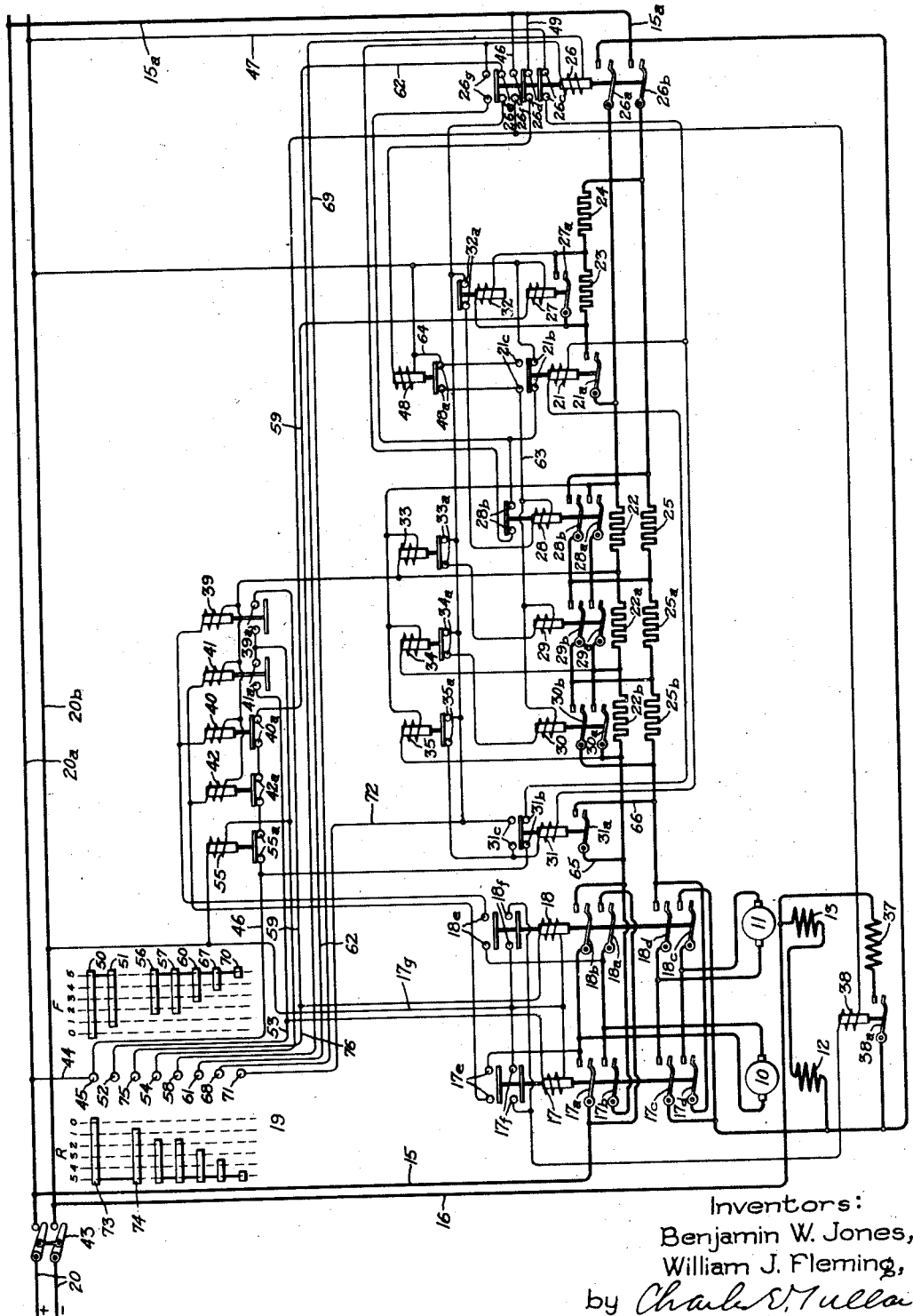

1,828,567

UNITED STATES PATENT OFFICE

BENJAMIN W. JONES AND WILLIAM J. FLEMING, OF SCHENECTADY, NEW YORK, ASSIGNORS TO GENERAL ELECTRIC COMPANY, A CORPORATION OF NEW YORK

CONTROLLER FOR ELECTRIC MOTORS

Application filed October 9, 1929. Serial No. 398,509.

This invention relates to controllers for electric motors, more particularly to controllers for effecting series parallel commutation of the circuit connections and has for an object the provision of a simple, effective and inexpensive controller by means of which a plurality of series motors may be started, stopped, reversed and otherwise controlled in a reliable and efficient manner.

In certain types of drives employing a plurality of series motors it is desirable that the series field windings of the motors remain connected in series with each other throughout the series, parallel, and reversal operations of the motors. As heretofore employed the advantages obtained from the use of this connection, i. e., permanently maintaining the series field windings in series with each other, have been offset by the attendant disadvantage that the field windings of standard series motors could not be permanently connected in series without being required to carry the combined armature currents when the armatures were operating in parallel. On the other hand if the field windings of the motors were specially designed to give normal field strength when carrying the combined armature currents of the armatures in parallel, the field strength was insufficient to give the desired speed torque characteristics when starting the motors from rest with the armatures in series.

Another disadvantage that arose out of permanently maintaining the series field windings in series with each other was that the stopping or reversal of the motors by "plugging", i. e., establishing reverse power connections, was attended by abnormal and unnecessarily high plugging voltages in the system that could only be reduced to a safe low value by the use of large and expensive resistors.

Accordingly another object of this invention is the provision of a controller by means of which the field windings of a plurality of ordinary series motors of standard design may be maintained in series with each other during the series and parallel connections of the armatures without being required to carry abnormally high currents when the armatures are connected in parallel or abnormally low currents when the armatures are connected in series.

A further object of this invention is the provision of a controller by means of which the motors may be stopped or reversed by plugging and the plugging voltage be kept at a low value without employing additional expensive resistance devices for that purpose in the armature circuits of the motors.

In carrying this invention into effect in one form thereof we provide a controller for a plurality of series motors to establish a parallel path about the field windings of the motors when the armatures are connected in parallel and also to establish this shunt path about the field windings when the motors are stopped or reversed by plugging.

In illustrating this invention in one form thereof, we have shown it as embodied in a controller arranged to control two series motors. It will be understood, however, that the invention is not limited to a controller for controlling two motors; the number of motors not being of the essence of the invention since persons skilled in the art may readily adapt this controller to control any number of motors or groups of motors.

For a more complete understanding of this invention reference should now be had to the following specification and to the accompanying drawing the single figure of which is a simple diagrammatical representation of an embodiment of our invention.

Referring now to the drawing, the armatures of a plurality of direct current motors 10 and 11 are mechanically connected by any suitable coupling means (not shown) to drive a suitable load. Since the particular type of load to be driven by these motors forms no part of the invention, it has been omitted from the drawing for the purpose of simplification. These motors are provided with series field windings 12 and 13 respectively which as shown in the drawing are permanently connected in series and remain so connected in series during all the operations of these motors to be described hereinafter. The motors 10 and 11 are connected to a suitable source of supply, represented in the drawing by the conductors 15, 16 for the forward direction of rotation by means of a contactor comprising an energizing coil 17 and normally open contacts $17_a$, $17_b$, $17_c$ and and $17_d$ controlled thereby. A reverse contactor comprising the energizing coil 18 and the normally open contacts $18_a$, $18_b$, $18_c$ and $18_d$ controlled thereby, serves when energized to connect the motors 10 and 11 to the source of supply for the reverse direction of rotation.

The energization of the contactors 17 and 18 is under the control of a manually operated multi-position drum switch 19 which serves when actuated from its neutral position to any of its operative positions to supply control current from a suitable source of supply represented in the drawing by the conductors 20, from which source of supply the conductors 15 and 16 for supplying power to the motors are also supplied as shown.

The series connections of the motors 10 and 11 are established in the neutral position of the controller 19 by means of a "series" contactor 21 which when energized serves to close its normally open contacts $21_a$ to connect the armatures of the motors in series with each other through the accelerating resistors 22, $22_a$, $22_b$, 23, 24, 25 $25_a$ and $25_b$. This series contactor performs the additional function of preventing the establishment of the parallel connections of the armatures of the motors until the motors have been accelerated in series from rest to a predetermined intermediate speed.

Parallel connections of the motors are established by means of the parallel contactor 26 which when energized in response to operation of the manually operated drum switch 19 serves to close its normally open contacts $26_a$ and $26_b$ to connect the armatures 10 and 11 of the motors to the source of supply 15 and 16 in parallel with each other through the series field windings 12 and 13.

Acceleration of the motors both during the series and parallel connections of the armatures is under the control of a plurality of accelerating contactors 27, 28, 29, 30 and 31 which when energized in the sequence named serve to close their normally open contacts $27_a$, $28_a$, $28_b$, $29_a$, $29_b$, $30_a$, $30_b$ and $31_a$ to exclude various sections of the accelerating resistors which they control from the armature circuit of the motors. In order that the motors shall not be accelerated too rapidly, a time delay of sufficient duration is caused to be inserted between the operation of each accelerating contactor and the operation of the succeeding contactor. Although any suitable type of time delay device may be employed for this purpose we prefer to use the inductive time delay relays 32, 33, 34 and 35 whose coils are energized in accordance with the voltage existing across various portions of the accelerating resistors and which due solely to the inductance of their windings insert a time delay between the de-energization of their coils due to the short circuiting of the accelerating resistors and the return to the normal position of the contacts controlled thereby.

As shown in the drawing, one terminal of an impedance device 37 is connected to the line terminal of the series field winding 13. A contactor 38 serves when energized to close its normally open contacts $38_a$ to connect the opposite terminal of the impedance device 37 to the armature side of the field winding 12, thus placing the impedance device 37 in parallel with the series field windings 12 and 13. This impedance device 37 may be and preferably is designed to have electrical characteristics closely simulating those of the field windings 12 and 13 connected in series so that when it is connected in parallel with the field windings 12 and 13, the armature currents of the motors will always tend to divide evenly, one-half flowing through the field windings and the other half through the impedance device 37 even despite sudden changes, i. e., increases or decreases in the amount of current flowing in the circuit. The best results will naturally be obtained when the impedance device 37 is an inductive resistance having the same ohmic and reactive values as those of the field windings 12 and 13 in series. However, we would have it understood that the invention is not at all limited to the use of a reactive resistor since excellent results may also be obtained by using a resistor having little or no inductance. During the stopping or reversal operations of the motors the energization of the contactor 38 is under the control of the plugging relays 39 and 40 for the one direction of rotation and under the control of the plugging relays 41 and 42 for the opposite direction of rotation.

The contactor 38 which serves to connect the impedance device 37 in parallel with the field windings 12 and 13 is arranged to be energized by means of the manually operated controller 19 when the armatures of the motors 10 and 11 are connected in parallel either for the forward or reverse direction of rotation and also when the armatures are connected in series for either direction of rotation after prior parallel operation in the opposite direction, provided that reverse line connections are established within a predetermined period.

However, when the motors are accelerated from rest the contactor 38 remains deenergized during the period that the motors are connected in series. Thus it will be seen that the impedance device 37 is connected in parallel with the field windings 12 and 13 when the armatures are operating in parallel and also when the armatures are connected in series with the line for stopping and reversing by plugging.

With the above understanding of the elements and apparatus comprised in an embodiment of our novel controller, the operations effected thereby will readily be understood from the detailed explanation which follows.

The various parts of the apparatus are shown in their normal, deenergized or pre-starting positions with the line switch 43 operated to the open position. In operation, the line switch 43 is first actuated to the closed position which serves to connect the energizing coil of the series contactor 21 across the source 20, the circuit being traced from the positive side of the source 20 by way of conductor 44 to contact 45 of the drum controller, thence by conductor 46, through normally closed interlocks $31_b$ of the contactor 31, through coil 21 thence through normally closed interlocks $26_c$ of the parallel contactor 26, by conductor 47 to the negative side of the source 20. The contactor 21 in responding to the energization of its coil closes its normally open contacts $21_a$ in the power circuit of the motors and also opens its normally closed interlock $21_b$ and closes its normally open interlock $21_c$. The closing of the contacts $21_a$ serves to connect the armatures 10 and 11 of the motors in series with each other through the accelerating resistors $22_b, 22_a, 22, 21_a, 24, 25, 25_a$ and $25_b$. A special sequencing relay 48 whose function will be more clearly explained in connection with the parallel operation of the motors is also connected across the line when the line switch 43 is closed, the energizing circuit of its coil being traced from the positive conductor 20, over conductors 49, $20_a$, $15_a$, and through normally closed interlock $26_d$ of the parallel contactor 26, through the coil of the contactor 48 and conductor $20_b$ to the negative side of the source 20. The contactor 48 opens its normally closed contacts $48_a$ by way of response to the energization of its coil.

If it be desired to operate the motors in the forward direction of rotation the drum switch 19 is actuated to the left to its first operative position in which its segments 50 and 51 engage the stationary contacts 45 and 52 respectively. This operation causes the coil of the forward contactor 17 to be connected across the source of supply over a circuit extending from the contact 45 through segments 50, 51 of the drum controller contact 52, conductor 53, coil 17, conductors $17_g$, $20_b$ and thence to the negative side of the source 20. Contactor 17 in responding to the energization of its coil closes its normally open contacts $17_a$ and $17_b$, $17_c$ and $17_d$ and thereby connects the armatures 10 and 11 of the motors to the source of supply 15, 16 in series relationship with all the accelerating resistance; the series field windings 12 and 13 likewise being included in this series circuit; the circuit being traced from the positive side of the source 15 through contacts $17_a$, armature of the motor 10, contacts $17_b$, resistance section $22_b, 22_a$, resistance section 22, contact $21_a$ (previously closed), resistance sections 23 and 24, resistance sections 25, $25_a$ and $25_b$, contacts $17_b$, armature of motor 11, contacts $17_c$, the series field windings 12 and 13 in series and thence to the negative side of the supply line.

It will be noted that the contactor 17 also closes its interlocks $17_e$ and $17_f$; the interlock $17_e$ serving to connect the plugging relays 41 and 42 from the positive side of the armature 10 to an intermediate point between the sections 22 and $22_a$ of the accelerating resistor thus energizing the operating coils of relays 41 and 42. Energization of the coils of the relays 41 and 42 causes these relays to close the normally open contacts $41_a$, and to open normally closed contacts $42_a$. The opening of the contacts $42_a$ serves to interrupt the circuit of the contactor 38 whilst the closing of the normally open contacts $41_a$ serves to connect the contact 54 of the drum controller with conductor 53 which it will be remembered is connected through segments 51 and 50 with the positive side of the line.

The closing of contacts $41_a$ performs the additional function of connecting the coil of a special control relay 55 across the line, the circuit being readily traced from the conductor 53 through the contacts $41_a$, coil 55, to the negative side of the source. In responding to energization of its coil the relay 55 opens its normally closed contacts $55_a$. Thus, it will be noted at this point that the coil of the contactor 38 which controls the connection of the reactive resistance 37 about the field windings 12 and 13 is interrupted at contacts $55_a$ and $42_a$ so that this contactor can not be energized and closed when the armatures of the two motors are in series when starting from rest.

Since the inductive coils of the time delay relay 32, 33, 34 and 35 are connected across certain sections of the accelerating resistance, they will be energized and will operate their respective normally closed contacts $32_a$, $33_a$, $34_a$ and $35_a$ to the open position thereby interrupting the energizing circuits of the accelerating contactors 28, 29, 30 and 31 respectively.

The speed of the motors may be accelerated in the forward direction by operating the drum switch 19 to the second forward position in which its segments 56 and 57 will be caused to engage with the stationary contacts 54 and 58. It will be remembered that contact 54 was previously connected with the positive side of the supply line by the closing of contacts $41_a$. Segment 57 in engaging the contact 58 serves to connect the coil of contactor 27 across the source of supply, the circuit being traced through the controller to the contact 54 as before, then through the segments 56, 57, contact 58, conductor 59 through coil 27 to the negative supply line.

The energization of coil 27 results in the closing of normally open contacts $27_a$ to short circuit a portion 23 of the accelerating resistance thereby excluding it from the armature circuit and causing the speed of the motors to be increased. Since the coil of the inductive time delay relay 32 is energized across the section 23 of the resistance the closing of contacts $27_a$ also short circuits the coil 32 which, however, remains energized for a brief interval of time, due to the inductance of its circuit, after which it becomes deenergized. Deenergization of the coil 32 permits the normally closed contacts $32_a$ to return to their normal or closed position so that when the switch 19 is actuated to its third operative position an energizing circuit will be established for accelerating contactor 28 which circuit may be traced from the positive side of the supply source to the segment 57 of the controller as before and thence through segment 60, contact 61, conductor 62, normally closed interlocks $26_e$ of the parallel contactor 26, normally closed contacts $32_a$, coil 28, conductor 63, contacts $21_c$ in the closed position of the interlock, conductor 64 to the negative side of the supply source. Contactor 28 closes its contacts $28_a$ and $28_b$ responsively to the energization of its coil thereby to short circuit the sections 22 and 25 of the armature resistance.

It will be noted at this point that the energizing coils of the contactors 29, 30 and 31 are all connected in parallel with the coil 28. The closing of contacts $28_a$ serves to short circuit the energizing coil of the inductive time delay relay 33 which after a time delay due to the inductance of its winding permits its contacts $33_a$ to return to their normal or closed position in which they complete an energizing circuit for the coil of accelerating contactor 29; the circuit being the same as that previously traced for the contactor 28 with the exception, of course, that it passes through the contacts $33_a$. Contactor 29 closes normally open contacts $29_a$ and $29_b$ responsively to the energization of its coil to exclude the resistance sections $22_a$, $25_a$ from the armature circuits. In the same manner the contactors 30 and 31 are energized and the resistance sections $22_b$, $25_b$ and 24 short circuited thereby removing all the resistance from the armature circuit. It will be noted at this point that contactor 31 in closing its contacts $31_a$ to exclude the resistance section 24 connects the armatures 10 and 11 of the two motors in series with each other across the line by way of the conductors 65 and 66.

Contactor 31 when responding to the energization of its coil also closes its normally open contacts $31_e$ to establish a self-holding circuit independently of the contacts $35_a$ and opens its normally closed contacts $31_b$ thereby interrupting the energizing circuit of the series contactor 21 which permits its contacts $21_a$, $21_b$ and $21_c$ to return to the normal position in which they are shown in the drawing.

It will be recalled that the circuits for the coils of contactors 28, 29 and 30 were completed through the contact $21_c$ in the closed position. Therefore, the return of contact $21_c$ to the open position serves to open the energizing circuit of the contactors 28, 29 and 30 thereby permitting the contacts $28_a$, $28_b$, $29_a$, $29_b$, $30_a$ and $30_b$ to return to their normal or open position as a result of which the short circuits are removed from the sections 22, $22_a$, $22_b$, 25, $25_a$ and $25_b$ of the accelerating resistance preparatory to its being reinserted in the armature circuit after the parallel connection of the armatures is completed. The deenergization of the contactor 28 permits its normally closed interlock $28_b$ to return to its normal or closed position.

The actuation of the switch 19 to its fourth operative position establishes an energizing circuit for the coil of the parallel contactor 26, this energizing circuit being traced from the positive supply conductor to the segment 60 of the controller as before, thence by way of segment 67, contact 68, conductor 69, coil 26, normally closed interlocks $28_b$ of the accelerating contactor 28, normally closed interlock $21_b$ of series relay 21 to the negative side of the source of supply. Parallel contactor 26 in responding to its energization closes its normally open contacts $26_a$ and $26_b$ to connect the armatures 10 and 11 of the motors to the source of supply 15 and 16 in parallel with each other; the circuit of the armature 11 being traced from the positive side of the source 20, conductors $20_a$ and $15_a$, contact $26_b$, resistance sections 25, $25_a$ and $25_b$, contact $17_b$, armature 11, contact $17_b$, through the field windings 12 and 13 in series and thence to the negative side of the source of supply and the circuit for the armature 10 being traced from conductor 15, through contact $17_a$, armature 10, contact $17_b$, resistance sections $22_b$, $22_a$ and 22, contact $26_a$, field windings 12 and 13 in series, and thence to the negative side of the source of supply. Contactor 26 in responding to energization also closes its normally open contacts $26_f$ and $26_g$ and opens its normally closed contacts $26_c$, $26_d$ and $26_e$.

The closing of the contacts $26_f$ serves to establish an energizing circuit for the coil of the contactor 38, the circuit being traced from the positive side of the source of supply by way of conductors $20_a$ and $15_a$ through contacts $26_f$, coil 38, interlock $17_f$ in the closed position, conductor $17_g$ to the negative side of the source of supply. As a result of the energization of the coil of contactor 38 normally open contacts $38_a$ are operated to the closed position placing the reactive resistance 37 in parallel with the series field windings 12 and 13 of the motors.

The opening of the normally closed contacts 26_c interrupts the energizing circuit of the fourth accelerating contactor 31, thereby permitting the contacts 31_a, 31_b and 31_c to return to the normal position in which they are shown. The series contactor 21 is not reenergized as a result of the closing of contacts 31_b since the circuit is open at the contacts 26_c of the parallel contactor. The opening of contacts 26_d results in deenergization of the coil of the special sequencing contactor 48 thereby permitting its contact 48_a to return to the normal position shown in the drawing.

The motors may now be accelerated in parallel by actuating the switch 19 to the left to its fifth operative position. If the contact 48_b has not yet returned to its normal position nothing can happen at this time. Since the energizing circuits of the accelerating contactors must pass through the contacts 48_a, and since these contacts remain in the open position until the parallel contactor 26 is energized and establishes the parallel connections it will be seen that the contactor 48 serves to prevent the accelerating contactors from closing until the parallel connections for the armatures have been completed.

When the contact 48_a has returned to its normal position in response to the deenergization of its coil the control circuits for the accelerating contactors 28, 29 and 30 may be reestablished. The reinsertion of the accelerating resistors in the armature circuits of the motors causes the time delay relays 33, 34 and 35 again to be energized and to operate their normally closed contacts 33_a, 34_a and 35_a to the open position. Relay 32, however, does not become energized again since the section of the resistor 23 across which it is connected is itself not reconnected in the armature circuit of the motors.

The actuation of switch 19 to its fifth operating position establishes an energizing circuit for the contactor 28 from the segment 70 by way of contact 71, conductor 72, normally closed contact 32_a, and thence by conductor 63, contact 48_a in the closed position and conductor 64 to the negative side of the supply line. The contactors 29 and 30 are subsequently energized and closed and all the resistance excluded from the armature circuits in a manner identical with that described in connection with the acceleration of the motors when the armatures were connected in series. The fourth accelerating contactor 31, however, may not be reclosed since its energizing circuit passes through the interlock 26_c which is maintained in an open position by the parallel contactor 26.

The motors are now operating with the armatures in parallel with each other and the reactive resistance 37 is connected in parallel with the series field windings 12 and 13 of the motors. The reactive resistance 37 may, of course, be designed to bypass any amount of current about the field windings 12 and 13 but it is preferably designed so that it will divert enough current to prevent the field windings from being required to carry more than the armature current of one motor. Thus, it will be seen that in the parallel connection of the armature the combined current of the armature does not flow through the field windings 12 and 13 because of the parallel path through the reactive resistance 37. As pointed out before, the connection of the reactive resistance 37 in parallel with the field windings 12 and 13 makes possible the use of perfectly standard series motors with their field windings connected in series throughout the series and parallel operations of the motors.

If it should be desired to stop the motors or to reverse the direction of rotation this may be done quickly by throwing the drum switch 19 from the extreme left hand position to the extreme right hand position. As the switch 19 passes through the neutral position the apparatus will all be returned to the normal position in which it is shown in the drawing with the exception of the series contactor 21 and the special sequencing contactor 48, the coils of which will be connected directly across the line in the manner previously described. As the switch 19 passes through the first operative position to the right the segments 73 and 74 will be caused to engage the contacts 45 and 75 thereby to establish an energizing circuit for the coil of the reverse contactor 18, the circuit being traced from the contact 45 through the segments 73 and 74, contact 75, conductor 76, coil of contactor 18 to the negative side of the line. Contactor 18 will respond to the energization of its coil and close its normally open reversing contacts 18_a, 18_b, 18_c and 18_d thereby connecting the armatures 10 and 11 of the motors to the source of supply 15 and 16 in series relationship with each other and with all the accelerating resistance in the armature circuit as before. It will be clear that more than normal voltage will result from this sudden reverse connection due to the countervoltages of the armatures 10 and 11 which due to the previous operation of the motors in the forward direction is now in a direction to add to the line voltage rather than to oppose it. Reverse contactor 18 also closes its interlock 18_e to establish energizing circuits for the plugging relays 39 and 40 and simultaneously its interlock 18_f to complete an energizing circuit for the contactor 38.

The contactor 38 closes its normally open contacts 38_a to connect the reactive resistance 37 in parallel with the field windings 12 and 13. Due, however, to the countervoltage of the motor, the relays 39 and 40 are not energized immediately since the intermediate point of the resistors to which they are connected is practically at the same potential as the armature terminal of the motor to which they are connected. As the speed of the motor 10 decreases the countervoltage also decreases, thus permitting plugging relay 39 to become energized. The coil of this relay is preferably designed to pick up its contact $39_a$ at approximately 40% of the line voltage. The closing of the contact $39_a$ results in energizing the relay 55 which then opens its contacts $55_a$ to deenergize the contactor 38 as a result of which the parallel connection of the reactive resistance 37 about the field windings is interrupted.

The plugging relay 40 is designed to pick up at approximately 55% to 60% of line voltage so that when the countervoltage of the motor 10 is decreased sufficiently to allow 55% to 60% of normal line voltage to be applied to the coil to relay 40, this relay will open its contacts $40_a$.

It will be seen that immediately upon establishment of the reverse connections that the reactive resistance 37 is connected in parallel with the field windings 12 and 13 thereby shunting away a portion of the armature current from the field windings, as a result of which the countervoltage of the motors is reduced to a safe value. As soon as the speed of the motors is decreased and the countervoltage of the motors further reduced the reactive resistance 37 is removed from in parallel with windings 12 and 13 thereby increasing the strength of the field and increasing the plugging torque of the motors which enables them to be brought to rest more quickly. If the reactive resistance 37 were no connected to provide a parallel path about the field windings 12 and 13 when the plugging connections are first established the field windings would naturally carry total armature current and the countervoltage generated by the motors would be full value. By diverting a portion of the armature current about the field windings 12 and 13, the fields are so weakened that the countervolage generated by each motor is only approximately 50% of its normal value and thus in the illustration shown in the drawing the total plugging voltage of the system, that is the sum of the countervoltages of both motors plus the line voltage does not exceed 200% of normal line voltage.

From this point on the accelerating operation of the motors in series and parallel is exactly the same as that already described for the forward direction of rotation and, if the motors should again be plugged from the reverse direction of rotation to the forward direction of rotation, the operation will also be the same as that already described with the single exception that the functions ascribed to the plugging relays 39 and 40 will be performed by the plugging relays 41 and 42.

Although we have described our invention as embodied in specific apparatus and operating in a particular manner we would have it understood that the invention is not limited thereto since alterations and modifications may be made by persons skilled in the art without departing from the true spirit of the invention or from the scope of the annexed claims.

What we claim as new and desire to secure by Letters Patent of the United States, is,—

1. A controller for a plurality of series motors comprising a current limiting device, means for establishing line connections for the motors with their armatures in parallel and their field windings in series, means for subsequently establishing reverse line connections of the motors with their armatures and field windings in series with said current limiting device, a resistance device, means responsive to the establishment of reverse line connections to connect said resistance device in parallel circuit with the field windings to reduce the plugging voltage of the motors, and means for responding to a predetermined decrease in countervoltage to open said parallel circuit to increase the plugging torque of the motors.

2. A motor control system comprising a plurality of series motors, a current limiting device, means for connecting the motors to the line with their armatures in parallel and their field windings in series, means for subsequently establishing reverse line connections of the motors with their armatures and field windings and said current limiting device in series, a reactive resistance, means operable in response to the establishment of reverse line connections for connecting said resistance in a parallel circuit about the field windings of the motors to reduce the plugging torque of the motors, and means operable in response to a predetermined decrease of motor countervoltage to open said parallel circuit to increase the plugging torque of the motors.

3. A motor control system comprising a plurality of series motors, a controller having a plurality of operative positions, a current limiting device, means operable in response to operation of said controller to one of said positions to connect the motors to a source of power with their armatures in parallel and their field windings in series, means operable in response to operation of said controller to a second position to connect the motors to the source for reverse rotation with their armature field windings and said current limiting device in series, a reactive resistance means operable in response to establishment of reverse power connections, to connect said resistance in parallel with the field windings of the motors to reduce the plugging voltage thereof, and means operable in response to a predetermined decrease in plugging voltage to disconnect said resistance device to increase the plugging torque.

In witness whereof, we have hereunto set our hands this 8th day of October, 1929.

BENJAMIN W. JONES.
WILLIAM J. FLEMING.